July 24, 1934. E. G. ELLSTROM 1,967,992
SAUSAGE CONTAINER
Filed April 9, 1932

INVENTOR:
E. G. Ellstrom.
BY
ATTORNEY.

Patented July 24, 1934

1,967,992

UNITED STATES PATENT OFFICE 1,967,992

SAUSAGE CONTAINER

Elmer G. Ellstrom, Webster Groves, Mo., assignor to Sefton National Fibre Can Co., Maplewood, Mo., a corporation of Delaware Application April 9, 1932, Serial No. 604,253

2 Claims. (Cl. 229—93)

This invention relates to containers, and, more particularly to a container in which sausage, such as braunschweiger, and the like, can be transported by the packer thereof to the butcher shop.

The primary object of the invention is the provision of a sausage shipping container, so constructed that it can be used several times for the purpose intended, before its usefulness would be destroyed.

Another object of the invention resides in the provision of a container in the form of a helically or convolutely wound paper container, tubular in form, open at both ends and having associated therewith a transverse supporting member to which one end of a sausage can be tied by a string connected to one end of the sausage.

A further object of the invention is the provision of a tubular shipping container having a stiff paper wall, a transverse member associated with one end of the container serving as a support to which one end of a sausage can be tied after insertion into the container from the opposite end thereof, and which member also serves as a handle by means of which the container can be carried, as well as by means of which it can be hung from a hook, or like support.

Another object of the invention is the provision of a container which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views.

In carrying out the aim of my present invention, I employ a suitable tubular body 1 having associated therewith a suitable cross member 2.

The tubular body 1 is preferably, although not necessarily, made or formed from fibrous material, such as pasteboard as used in forming mailing tubes. The wall of the body may be formed of any desired number of plies to render the body stiff and capable of being used several times for the purpose intended. It will be understood that the tubular body 1 is open at both ends and is of any desired length and diameter to accommodate the goods to be shipped, or transported therein, such for instance as braunschweiger.

The cross member 2 of the container is also preferably, although not necessarily, made in the form of a stiff fibrous tube, formed from helically or convolutely wound paper such as used in the forming of mailing tubes.

Figure 1:
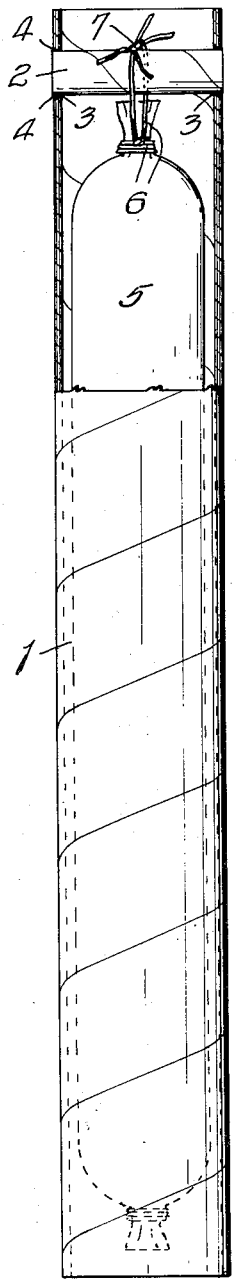
Fig. 1 is a view partly in side elevation and partly in sectional elevation of a container embodying the features of my invention, the same being shown as housing a sausage, which is supported therein.
Figure 2:
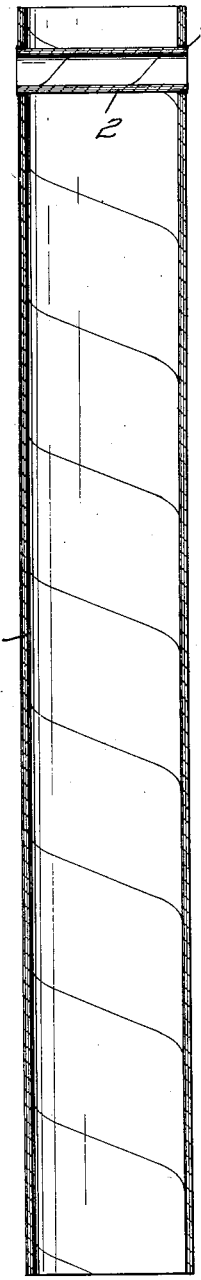
Fig. 2 is a longitudinal sectional view of the container.
Figure 3:
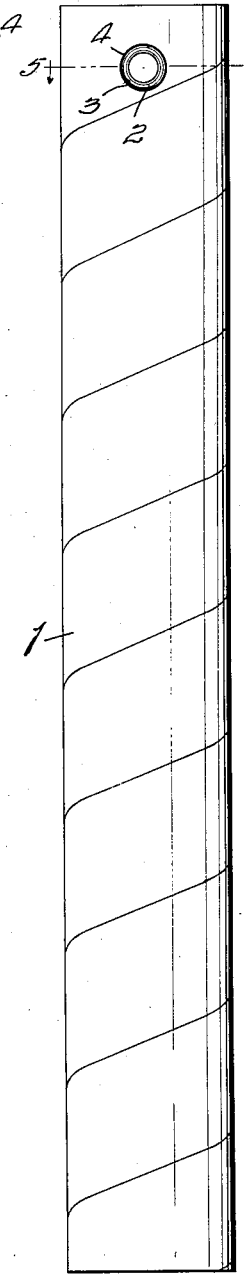
Fig. 3 is a side elevation of the container.
Figure 4:
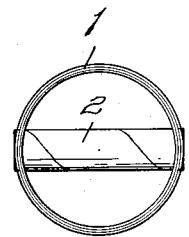
Fig. 4 is a top plan view of the container.
Figure 5:
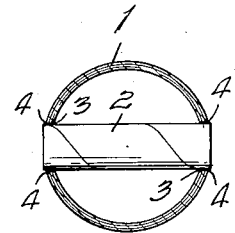
Fig. 5 is a view taken on line 5—5 of Fig. 3.

The cross member 2 is connected to the wall of the tubular body 1, near one end thereof, as shown in Fig. 1. The ends of the cross member 2 are receivable in opposed openings 3 formed in the wall of the tubular body 1 and are preferably glued to the wall of the tubular body 1, as at 4, to prevent longitudinal displacement of the cross member.

The contents, or package 5, such as sausage, braunschweiger, or the like, designed to be carried in the container, is provided at one end with a suitable tie string 6 and this string is adapted to be connected to the cross member 2 for holding the contents from falling out of the container. The tie string can be connected to the cross member 2, which acts as a support, by winding the string around the cross member a number of times, or tying the ends of the string into a suitable knot 7. The contents 5 can only be inserted into the container and removed therefrom from one end thereof only, due to the transverse member 2, although both ends of the container are open. The contents are easily removable from one end of the container when the tie string has been released from the cross member 2.

Before or after the contents, or package 5 has been place in the container, the container can be carried by means of the cross member 2, as it serves as a handle, as is manifest.

The container can also be hung from a hook due to the use of the cross member 2, which, while disposed within the container, is accessible through the adjacent open end of the container.

The container has been found to be very useful, inexpensive and practical in the transportation of sausage, particularly braunschweiger, from the packer to the butcher, and particularly so as the container can be returned to the packer for use again and again due to its sturdy construction.

From the foregoing description, it is evident that the butcher can keep the sausage in the container until it is all sold, if so desired, thus the container serving as a protection to the sausage.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A shipping carton having, in combination, an open ended stiff tubular paper body cylindrical in form having opposed openings in the wall thereof near one end thereof and an open ended stiff tubular paper cross member cylindrical in form having its ends inserted into said wall openings for supporting the cross member within the aforesaid body.

2. A shipping carton having, in combination, an open ended stiff tubular paper body cylindrical in form having opposed openings in the wall thereof near one end thereof and an open ended stiff tubular paper cross member cylindrical in form having its ends inserted into said wall openings for supporting the cross member within the aforesaid body and an adhesive for adhesively connecting the ends of the cross member to the body to prevent displacement of the cross member relative to said body.

ELMER G. ELLSTROM.